(12) United States Patent
Mizusawa (10) Patent No.: US 7,756,618 B2
(45) Date of Patent: Jul. 13, 2010

(54) CAMERA CALIBRATION AND IMAGE ADJUSTING FOR DRIVE ASSISTING SYSTEM

(75) Inventor: Kazufumi Mizusawa, Kawasaki (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 10/566,104

(22) PCT Filed: Jan. 3, 2004

(86) PCT No.: PCT/JP2004/002478

§ 371 (c)(1),
(2), (4) Date: Jan. 26, 2006

(87) PCT Pub. No.: WO2005/014341

PCT Pub. Date: Feb. 17, 2005

(65) Prior Publication Data

US 2006/0209188 A1     Sep. 21, 2006

(30) Foreign Application Priority Data

Aug. 7, 2003 (JP) ............................. 2003-288976

(51) Int. Cl.
*G06F 7/00* (2006.01)
(52) U.S. Cl. ............................. 701/36; 701/41; 701/42; 382/104
(58) Field of Classification Search ................. 701/116, 701/36, 41, 42
See application file for complete search history.

(56) References Cited

U.S. PATENT DOCUMENTS 5,588,733 A * 12/1996 Gotou .......................... 362/37

6,421,081 B1 * 7/2002 Markus ....................... 348/148
6,476,730 B2 * 11/2002 Kakinami et al. ......... 340/932.2
6,487,481 B2 * 11/2002 Tanaka et al. ................. 701/41

(Continued)

FOREIGN PATENT DOCUMENTS

EP     1094668     4/2001

(Continued)

OTHER PUBLICATIONS

Chinese Office Action, Dec. 7, 2007. Including English translation.

*Primary Examiner*—Thomas G Black
*Assistant Examiner*—Sze-Hon Kong
(74) *Attorney, Agent, or Firm*—Pearne & Gordon LLP (57) ABSTRACT

An object of the present invention is to provide a drive assisting apparatus capable of displaying a high-precision predicted locus in a camera picture in a superimposing manner while suppressing an increase of cost in a minimum value, and further, capable of displaying loci on a screen up to edges of the screen with respect to all of locus data irrespective of adjusting amounts of display positions.

Display data is formed which is used to display a travel prediction locus of a vehicle corresponding to a steering angle of a steering wheel on a screen of an on-vehicle monitor (5) in a superimposing manner; adjusting data used to adjust a display position of the travel prediction locus is set; and the display position of the travel prediction locus formed based upon the display data corresponding to the steering angle of the steering wheel in connection to steering operation of the steering wheel is adjusted based upon the adjusting data, and the position-adjusted travel prediction locus is displayed on the screen of the on-vehicle monitor (5) in the superimposing manner.

4 Claims, 9 Drawing Sheets

U.S. PATENT DOCUMENTS

| | | | |
|---|---|---|---|
| 6,567,726 B2 * | 5/2003 | Sakiyama et al. | 701/1 |
| 6,587,760 B2 * | 7/2003 | Okamoto | 701/1 |
| 6,785,404 B1 * | 8/2004 | Shimazaki et al. | 382/104 |
| 6,813,371 B2 * | 11/2004 | Kakinami | 382/104 |
| 6,919,822 B2 * | 7/2005 | Tanaka et al. | 340/932.2 |
| 7,058,207 B2 | 6/2006 | Iida et al. | |
| 2001/0026317 A1 | 10/2001 | Kakinami | |
| 2001/0026371 A1 | 10/2001 | Nozaki | |
| 2002/0110262 A1 | 8/2002 | Iida et al. | |
| 2003/0045973 A1 | 3/2003 | Okamoto | |
| 2003/0058337 A1 | 3/2003 | Tanaka et al. | |

FOREIGN PATENT DOCUMENTS

| | | |
|---|---|---|
| EP | 1102226 | 5/2001 |
| EP | 1170172 A2 | 1/2002 |
| EP | 1288071 | 3/2003 |
| JP | 2610146 | 2/1997 |
| JP | 2610146 B2 | 2/1997 |
| JP | 11-16097 | 1/1999 |
| JP | 2000-229547 | 8/2000 |
| JP | 2001-187552 | 7/2001 |
| JP | 200219492 A | 1/2002 |
| JP | 2003-61085 | 2/2003 |
| JP | 2003-061085 | 2/2003 |
| JP | 2003-63336 | 3/2003 |
| KR | 20020066214 A | 8/2002 |

* cited by examiner

CAMERA CALIBRATION AND IMAGE ADJUSTING FOR DRIVE ASSISTING SYSTEM

TECHNICAL FIELD

The present invention is related to a drive assisting apparatus and a drive assisting method, which provide both a backward picture of a vehicle, which is acquired by an on-vehicle camera, and also, a guide for assisting a drive operation on the backward picture with respect to a driver of the vehicle.

BACKGROUND ART

Conventionally, drive assisting apparatus have been developed in which when vehicles are driven along backward directions, backward pictures acquired by on-vehicle cameras as to the vehicles are displayed on display screens of monitors within drivers' cabin. Among the drive assisting apparatus, such systems have been mostly employed. That is, in the systems, various guides are superimposed on pictures of the on-vehicle cameras to display the superimposed pictures, while these guides are used to assist driving operations and correspond to predicted loci when the vehicles are backwardly traveled along straight directions, and distance lines indicative of constant distances from rear edges of the vehicles. Another drive assisting apparatus has been provided which displays travel predicted loci in response to steering angles of a steering wheel in a superimposing manner when the vehicle is driven along the backward direction. In such drive assisting apparatus, the guides must be displayed on correct positions within the pictures of the on-vehicle cameras. As methods for displaying guides on correct positions, such a method has been proposed (refer to, for example, patent publication 1). In this method, while display data of predicted loci of a vehicle in correspondence with steering angles of a steering wheel is stored, display data is read out based upon a signal of a steering angle sensor so as to be displayed in a superimposing manner.

(Patent Publication 1) Japanese Patent NO.2610146

DISCLOSURE OF THE INVENTION

However, the following problems occur in the method by which while the display data of the predicted loci of the vehicle in correspondence with the steering angles of the steering wheel is stored, the display data is read out based upon the signal of the steering angle sensor so as to be displayed in the superimposing manner.

In most cases, camera parameters which are used so as to calculate the display data of the predicted locus are different from actual camera parameters, and the adjusting amounts are determined based upon the typical point set in the camera picture, so that sufficiently high precision cannot be always obtained. In this case, as the camera parameters, there are two parameters of internal parameters and external parameters. The internal parameters include a focal distance, a distortion coefficient of a lens, an aspect magnification ratio, and a coordinate of an image center position, whereas the external parameters include a tilt angle, a pan angle, and a roll angle.

In such a case that the steering wheel is steered in the maximum steering angle and a predicted locus up to a far distance is displayed, a predicted locus which should be displayed may be deviated from the display screen. In the case that the predicted loci to be displayed is prepared, if only data within the display screen are held, when the display position is adjusted, such a locus portion which is deviated from the display screen cannot be displayed because there is no data. In order to hold a locus outside the display screen, for example, a display position outside the display screen, which is not originally present, must be held as data. However, a confirmation for confirming a matching characteristic of the data can be hardly carried out.

Further, in such a case that the loci data is previously prepared, as the varying camera parameters, at least, three parameters such as a pan angle, a roll angle, and a tilt angle must be considered. Even when three values are simply prepared for each of these pan, roll, and tilt angles, 27 sorts of data must be prepared in total. Thus, a required memory amount is increased, resulting in high cost.

The present invention has been made to solve the problems, and therefore, has an object to provide a drive assisting apparatus and a drive assisting method, capable of displaying a high-precision predicted locus in a camera picture in a superimposing manner while suppressing an increase of cost in a minimum value, and further, capable of displaying loci on a screen up to edges of the screen with respect to all of locus data irrespective of adjusting amounts of display positions.

To achieve the above-described object, a drive assisting apparatus, according to the present invention, is featured by such a drive assisting apparatus for displaying an image around a vehicle, which is acquired by an on-vehicle camera, on a screen of an on-vehicle monitor, comprising: a data table for storing thereinto locus data which contains locus display data and adjusting data, the locus display data being used to display a travel predicted locus of the vehicle corresponding to a steering angle of a steering wheel on the screen, and the adjusting data being used to adjust a display position of the travel predicted locus on the screen based upon the locus display data; steering angle detecting means for detecting the steering angle of the steering wheel; and drive assisting image producing means for reading out the locus data corresponding to the steering angle detected by the steering angle detecting means from the data table, for producing a drive assisting image by superimposing the travel predicted locus on the image around the vehicle based upon the locus display data and the adjusting data, which are contained in the read locus data, and for outputting the drive assisting image to the on-vehicle monitor.

In accordance with this arrangement, since the display position of the travel predicted locus in correspondence with the steering angle is adjusted based upon the latest adjusting data, the previously prepared travel predicted locus can be displayed on the optimum position, and the precision as the guide of the locus can be improved.

The drive assisting apparatus according to the present invention may be alternatively comprised of display position adjusting amount setting means for setting a value of the adjusting data contained in the locus data corresponding to the steering angle.

In the drive assisting apparatus according to the present invention, the display position adjusting amount setting means may alternatively calculate values of adjusting data of the locus data with respect to all of other steering angles based upon a value of adjusting data of the locus data with respect to a typical steering angle.

In accordance with this arrangement, the display positions can be set to the optimum positions with respect to all of the steering angles by merely adjusting the display position of the travel predicted locus only as to the typical steering angle. Also, the operations for calculating the adjusting amounts of the display positions can be largely simplified.

In the drive assisting apparatus according to the present invention, the locus data stored in the data table may alternatively contain initial position setting data used to set an initial position of the travel prediction locus based upon locus display data in addition to both the locus display data and the adjusting data.

In accordance with this arrangement, while an exceptional process operation for recording the display position outside the screen is not required, the travel predicted loci can be displayed on the screen up to the edges of the screen with respect to all of the locus data irrespective of the adjusting amounts of the display positions.

In the drive assisting apparatus according to the present invention, the data table may alternatively store thereinto a plurality of different locus data sets as to a pan angle, or a roll angle as the locus data corresponding to the steering angle.

In accordance with this arrangement, the required memory amount can be reduced without deteriorating the precision as the guide of the travel predicted locus, and the cost can be reduced.

A drive assisting method, according to the present invention, is featured by such a drive assisting method for displaying an image around a vehicle, which is acquired by an on-vehicle camera, on a screen of an on-vehicle monitor, comprising: a step for forming display data which is used to display a travel prediction locus of a vehicle corresponding to a steering angle of a steering wheel on the screen of the on-vehicle monitor in a superimposing manner; a step for setting adjusting data used to adjust a display position of the travel prediction locus; and a step for adjusting the display position of the travel prediction locus formed based upon the display data corresponding to the steering angle of the steering wheel in connection to steering operation of the steering wheel based upon the adjusting data, and for displaying the position-adjusted travel prediction locus on the screen of the on-vehicle monitor in the superimposing manner.

In accordance with this method, since the display position of the travel predicted locus in correspondence with the steering angle is adjusted based upon the latest adjusting data, the previously prepared travel predicted locus can be displayed on the optimum position, and the precision as the guide of the locus can be improved.

In accordance with the present invention, since both the locus display data corresponding to the steering angle and the adjusting data of the display position are stored, and the display position of the travel predicted locus is precisely adjusted in response to the sensing result of the steering sensor, the travel predicted locus which has been previously prepared can be continuously displayed on the optimum position, and the precision as the guide of the travel predicted locus can be improved.

It should be understood that in the drawings, reference numeral 1 shows a vehicle; reference numeral 2 indicates an on-vehicle camera; reference numeral 3 represents a steering angle sensor; reference numeral 4 denotes a locus superimposing apparatus; reference numeral 5 shows an on-vehicle monitor; reference numeral 31 indicates a target plate for selecting local data sets; reference numerals 32, 33, and 35 shows markers; reference numeral 40 represents a data setting unit; reference numeral 41 indicates an individual adjusting amount setting unit; reference numeral 42 shows a locus data set selecting unit; reference numeral 43 denotes a locus data selecting unit; reference numeral 44 indicates a display position adjusting unit; reference numeral 45 represents a locus superimposing unit; reference numeral 46 shows a data table; reference numerals 51 and 51A denote selection buttons; and reference numerals 54 and 54A represent ascertain buttons.

BEST MODE FOR CARRYING OUT THE INVENTION

Referring now to drawings, embodiment modes of the present invention will be described in detail.

Figure 1:
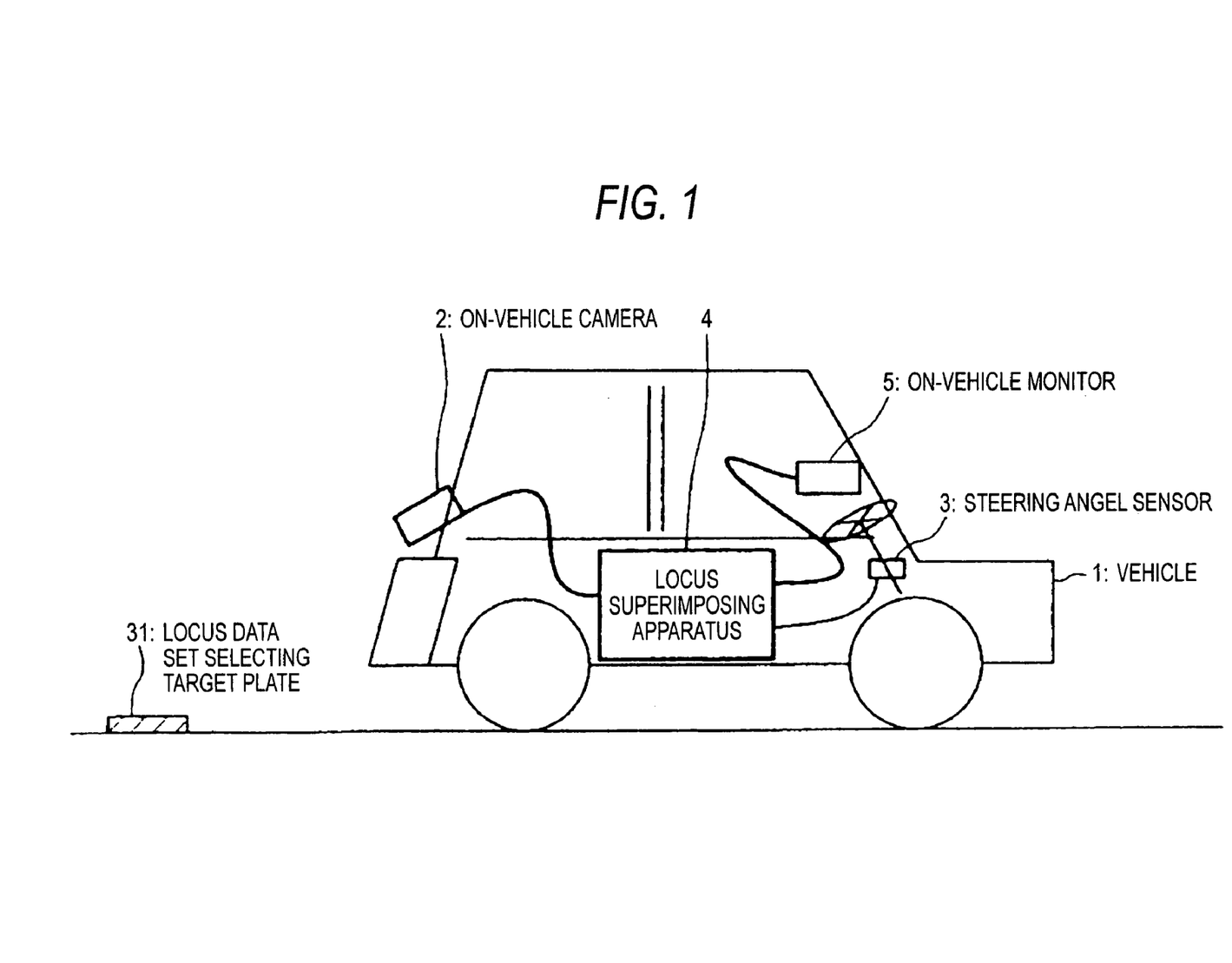
FIG. 1 is a block diagram for indicating a structure of a drive assisting apparatus according to an embodiment mode of the present invention.

FIG. 1 is a block diagram for showing an arrangement of a drive assisting apparatus according to an embodiment mode of the present invention. In FIG. 1, the drive assisting apparatus, according to this embodiment mode, is equipped with an on-vehicle camera 2, a steering angle sensor 3, a locus superimposing apparatus 4, and an on-vehicle monitor 5. The on-vehicle camera 2 is installed at a backward position of a vehicle 1. The steering angle sensor 3 detects a steering angle of the vehicle 1. The locus superimposing apparatus 4 superimposes a predicted locus in response to an output of the steering angle 3 on an image acquired by the on-vehicle camera 2 to output the superimposed image. The on-vehicle monitor 5 displays thereon the output of the locus superimposing apparatus 4 so as to provide the displayed output to a driver of the vehicle 1.

The on-vehicle camera 2 inputs an image acquired by imaging a backward scene of the vehicle 1 into the locus superimposing apparatus 4. The steering angle sensor 3 senses a rotation amount of a steering column of the vehicle 1, and inputs the sensed rotation amount to the locus superimposing apparatus 4. The locus superimposing apparatus 4 superimposes the predicted locus of the vehicle 1 in response to the steering angle inputted from the steering angle sensor 3 on a picture of the on-vehicle camera 2, and then, outputs the superimposed picture. The on-vehicle monitor 5 displays thereon the output of the locus superimposing apparatus 4.

Figure 2:
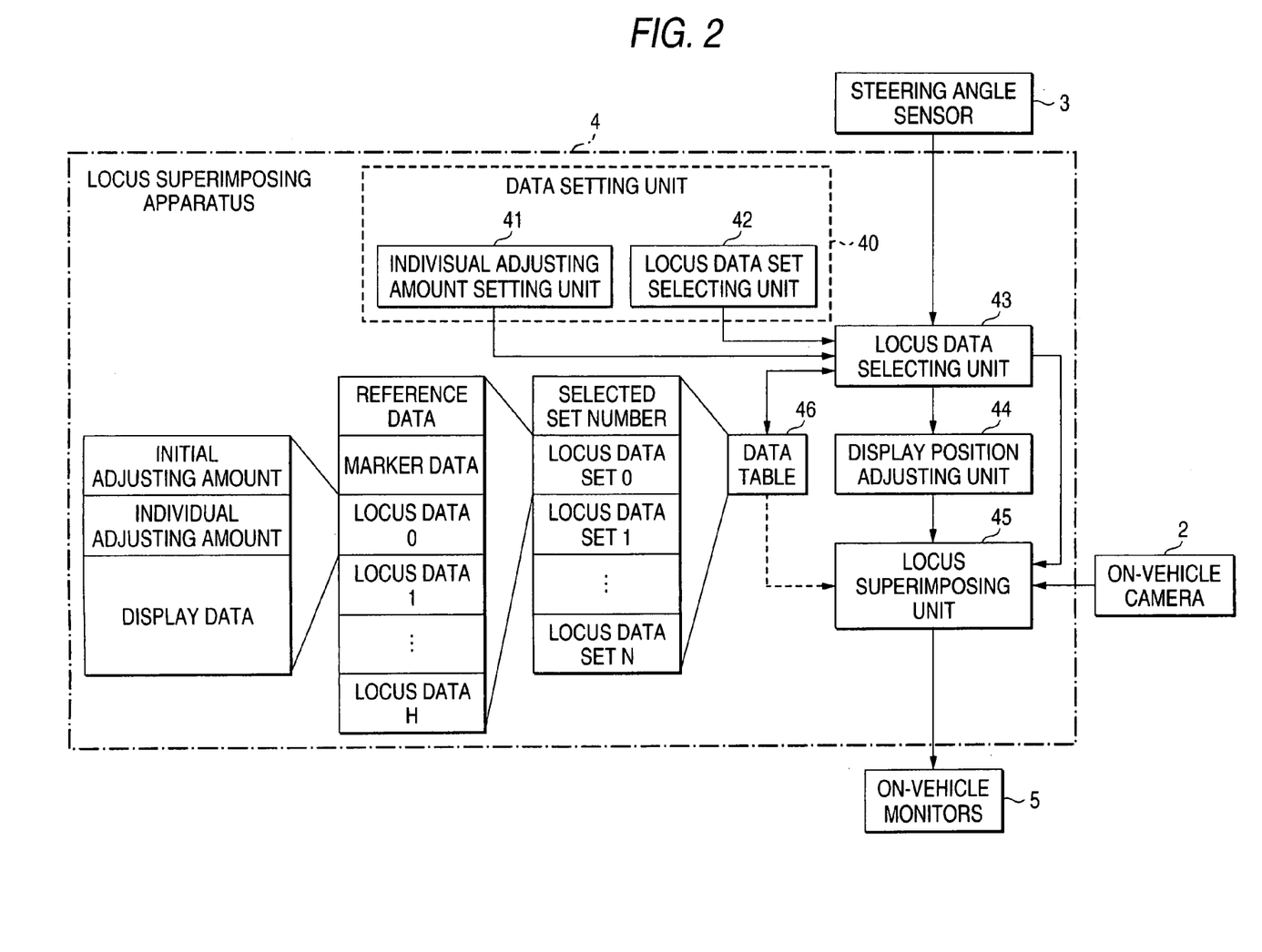
FIG. 2 is a block diagram for representing a detailed arrangement of a locus superimposing apparatus employed in the drive assisting apparatus of the embodiment mode of the present invention.

FIG. 2 is a block diagram for representing a detailed arrangement of the locus superimposing apparatus 4. In FIG. 2, the locus superimposing apparatus 4 is equipped with a data setting unit 40, a locus data selecting unit 43, a display position adjusting unit 44, a locus superimposing unit 45, and a data table 46. The data setting unit 40 contains both an individual adjusting amount setting unit 41 and a locus data set selecting unit 42.

As shown in FIG. 2, the data table 46 is constituted by a plurality of "locus data sets 0 to N" which have been previously prepared, and a "selected set number" indicative of such a locus data set which is actually used among the plural locus data sets "0" to "N". Then, each of the locus data sets "0" to "N" is arranged by "reference data", "marker data", and "locus data 0 to H". The reference data is employed in the case that a locus data set to be used is selected. The marker data is employed when an individual adjusting amount is determined. The locus data "0" to "H" correspond to the respective steering angles. In this case, assuming now that resolution is equal to, for instance, a steering angle of 1 degree, in such a case that data are held up to 40 degrees along right/left directions, a total number of locus data amounts to "81" pieces. Each of the locus data "0" to "H" is arranged by an "initial adjusting amount", an "individual adjusting amount", and "display data". The initial adjusting amount has been previously set. The individual adjusting amount is set after the on-vehicle camera has been installed. The display data corresponds to image data used to display a locus. Since the individual adjusting amounts are stored as data, a display position can be adjusted with respect to each of the steering angles.

Next, a description is made of operations as to the locus superimposing apparatus 4. In the case that the display positions of the locus data "0" to "H" which have been previously prepared are adjusted in response to positions where the on-vehicle camera 2 is mounted while a plurality of locus data sets are prepared by considering mounting errors of the on-vehicle camera 2, which are supposed, it is desirable to select an optimum locus data set from these plural locus data sets. For instance, in the case that an angle of mounting the on-vehicle camera 2 on the vehicle 1 is shifted from the ideal roll angle, a correct predicted locus on the screen does not become symmetrical on right/left sides with respect to a center of the vehicle 1, but constitutes a distorted shape. In this case, even when the display position of the predicted locus data which has been formed by the ideal roll angle is adjusted, the right-sided locus portion is not made coincident the left-sided locus portion. As a result, in addition to the locus data set of the idea roll angle, while a plurality of locus data sets in the case that the roll angles are shifted from the idea roll angle are prepared, it is desirable to select an optimum locus data set from these plural locus data sets.

Figure 3:
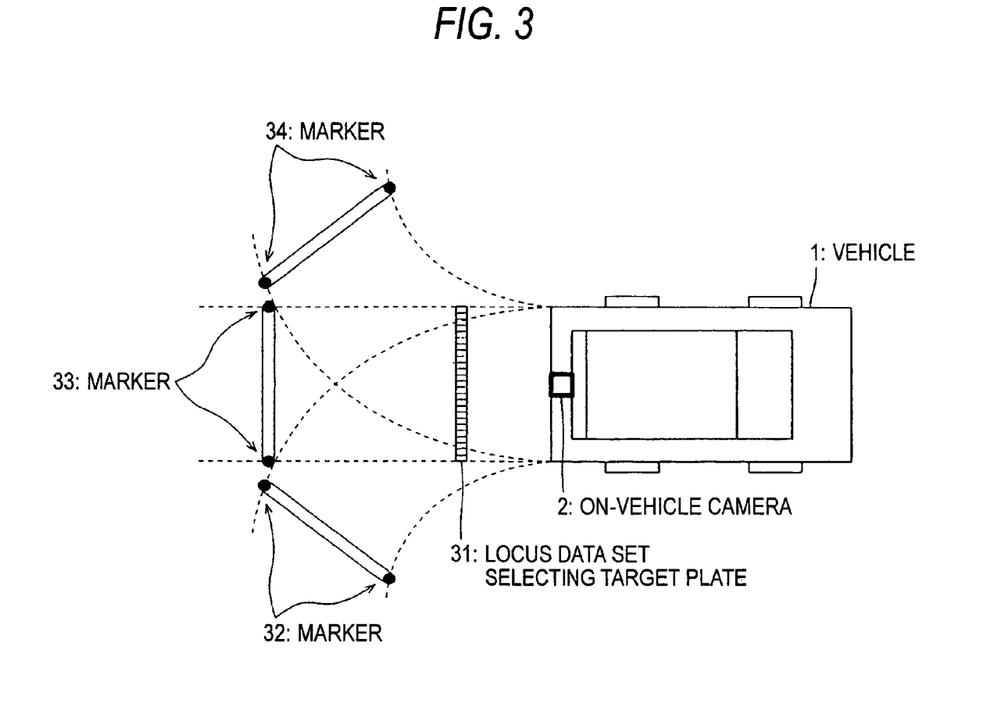
FIG. 3 is a diagram for explaining a selecting operation of a locus data set and a setting operation of an individual adjusting amount in the drive assisting apparatus according to the embodiment mode of the present invention.

The locus data set selecting unit 42 selects the optimum data set from the plurality of locus data sets which have been previously prepared. The selection of this locus data set is carried out as follows: That is, for instance, as shown in FIG. 3, a target plate 31 for selecting a locus data set is installed in such a manner that this target plate 31 is located at a position separated from the vehicle 1 by a constant distance along the backward direction and is positioned parallel to a rear wheel shift of the vehicle 1, and then, since a picture of this locus data set selecting target plate 31 displayed on the monitor screen is viewed, this locus data set is selected.

In this case, while the ideal roll angle is selected to be 0° (zero degree), it is so assumed that three sorts of locus data sets are prepared, i.e., (1) in the case that there is no shift in the roll angle; (2) in the case that the roll angle is shifted by a constant angle along a left direction; and in the case that the roll angle is shifted by a constant angle along a right direction. Such data (reference data) are prepared by calculating positions where the locus data set selecting target plate 31 is displayed in the picture of the on-vehicle camera 2 in response to the respective shifts of the roll angle. It should be noted that these data have been previously recorded in the data table 46.

Figure 4:
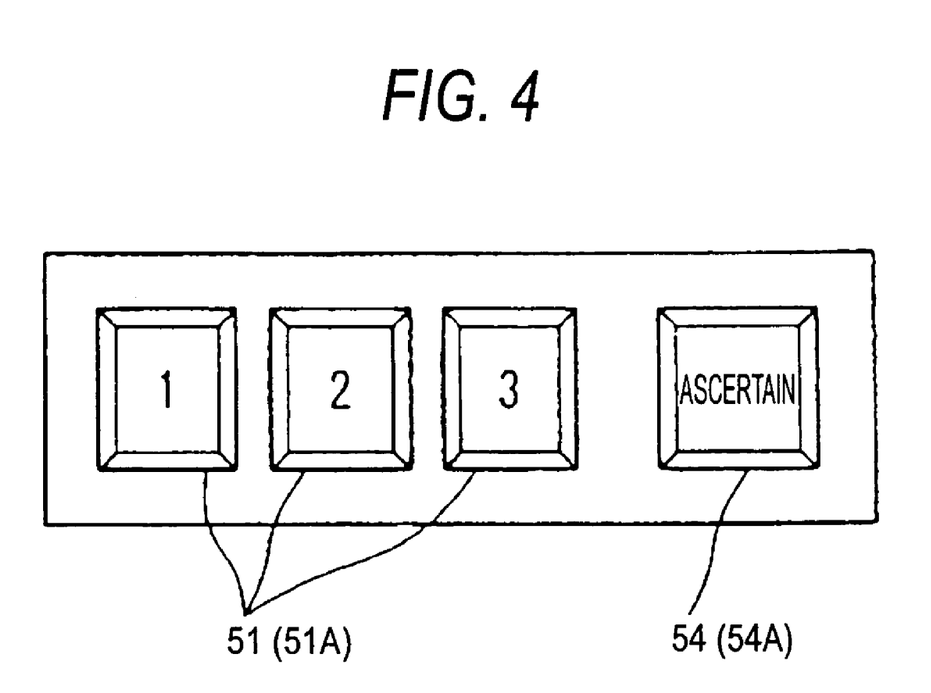
FIG. 4 is a diagram for showing switches used to select and ascertain both the locus data sets and markers in the drive assisting apparatus according to the embodiment mode of the present invention.

Next, a plurality (since three pieces of buttons are provided, these buttons will be handled as "3" hereinafter) of selection buttons 51 (numeral indications) are provided on the locus data set selecting unit 42, which correspond to the locus data sets, for example, as shown in FIG. 4. When any one of these three selection buttons 51 is pushed, the locus data set selecting unit 42 senses that this selection button 51 is pushed, and then, notifies to the locus data selecting unit 43, both such a fact that this detection implies a selection of a locus data set, and the number of the locus data set corresponding to this pushed selection button 51.

The locus data selecting unit 43 reads out reference data as to the locus data set corresponding to the depressed selection button 51 from the data table 46 in accordance with this notification content, and enters display data contained in this read reference data into the locus superimposing unit 45. At the same time, the locus data selecting unit 43 reads out both an initial adjusting amount and an individual adjusting amount, which are contained in the reference data, and then, inputs the initial adjusting amount and the individual adjusting amount to the display position adjusting unit 44. It should also be understood that although initial adjusting amounts of reference data have been previously set, individual adjusting amounts thereof are not set. When a locus data set is selected, since an individual adjusting amount is not required, this individual adjusting amount may be alternatively omitted.

The display position adjusting unit 44 owns a joystick corresponding to one of pointing devices, and calculates a display position based upon an operation result of this joystick and the various sorts of adjusting amounts derived from the locus data selecting unit 43, and then, applies this calculation result to the locus superimposing unit 45. For example, the display position is calculated in such a manner that the respective adjusting amounts notified from the locus data selecting unit 43 are employed as initial values, move amounts of the joystick are sequentially added to the initial values.

Figure 5:
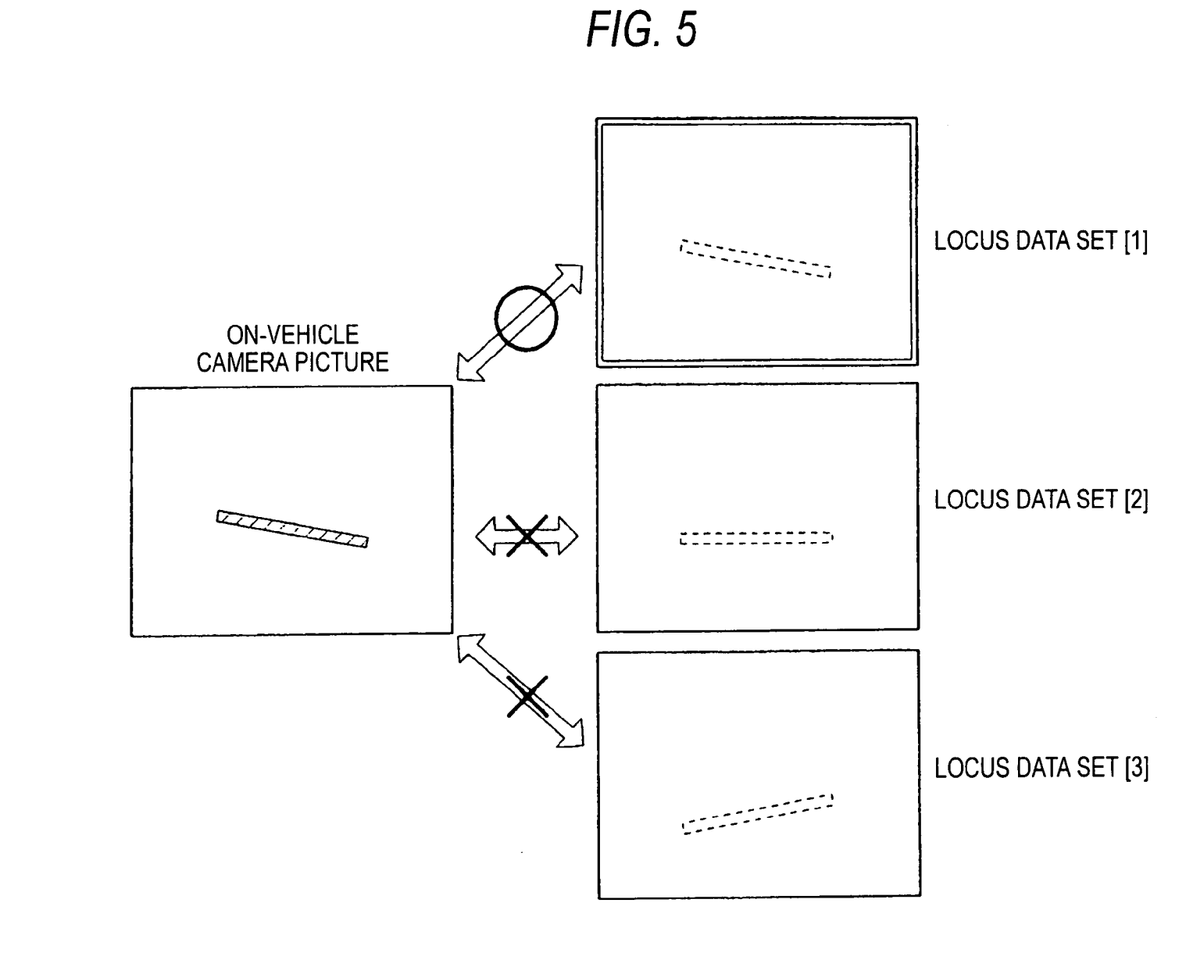
FIG. 5 is a diagram for explaining a selecting operation of locus data sets in the drive assisting apparatus according to the embodiment mode of the present invention.

The locus superimposing unit 45 superimposes the display data entered from the locus data selecting unit 43 on the picture of the on-vehicle camera 2 in such a manner that the display data is moved by such an adjusting amount notified from the display position adjusting unit 44. A resultant superimposed image is displayed on the screen of the on-vehicle monitor 5. As a consequence, since one of the three selection buttons 51 of the locus data set selecting unit 42 is depressed, a reference shape of any one of such locus data sets "1" through "3" as shown in FIG. 5 is superimposed on the picture of the on-vehicle camera 2, and then, the superimposed picture is displayed on the on-vehicle monitor 5.

Since the selection button 51 of the numeral "1" is pushed, a reference shape of the locus data set "1" (namely, uppermost diagram) is superimposed on the picture of the on-vehicle camera 2; since the selection button 51 of the numeral "2" is pushed, a reference shape of the locus data set "2" (namely, center diagram) is superimposed on the picture of the on-vehicle camera 2; since the selection button 51 of the numeral "3" is pushed, a reference shape of the locus data set "3" (namely, lowermost diagram) is superimposed on the picture of the on-vehicle camera 2.

Then, a locus data set corresponds to "1" in this drawing, the inclination of which is optimally made coincident with that of the locus data set selecting target plate 31 within the picture of the on-vehicle camera 5 among these reference shapes. In this case, under condition that the locus data set "1" is displayed, when the ascertain button 54 (indication of "ascertain") provided in the locus data set selecting unit 42, the locus data selecting unit 43 changes a selected set number contained in the data table 46 into the presently selected data set number, namely "1". With execution of the above-described operation, the optimum locus data set is selected with respect to the mounting position of the on-vehicle camera 2.

Next, a setting operation of an individual adjusting amount with respect to the selected locus data set is carried out. A plurality of selection buttons (defined as "51A" in this embodiment) similar to, for example, the selection buttons indicated in FIG. 4 are provided in the individual adjusting amount setting unit 41. These selection buttons 51A correspond to marker (reference marker) positions which constitute references of adjustments. When anyone of the selection buttons 51A is depressed, the individual adjusting amount setting unit 41 senses this switch depression, and notifies both such a fact that this switch depression is to set the individual adjusting amount and the number of the reference marker corresponding to this depressed selection button 51A to the locus data selecting unit 43.

The locus data selecting unit 43 reads out data (marker data) of the reference marker corresponding to this notification content, and the, inputs the read marker data to the locus superimposing unit 45. At the same time, the locus data selecting unit 43 reads out an initial adjusting amount contained in the marker data, and then, notifies the read initial adjusting amount to the display position adjusting unit 44. It should also be noted that as the marker, for instance, as shown in FIG. 3 (a portion of this marker), while three markers 32, 33, 34 are set at positions which are separated from a vehicle on a predicted locus by a constant distance so as to be used, the marker 32 is set on a locus of a right direction during a maximum steering angle; the marker 33 is set on a locus during a straight driving operation; and the marker 34 is set on a locus of a left direction during a maximum steering angle.

Figure 6:
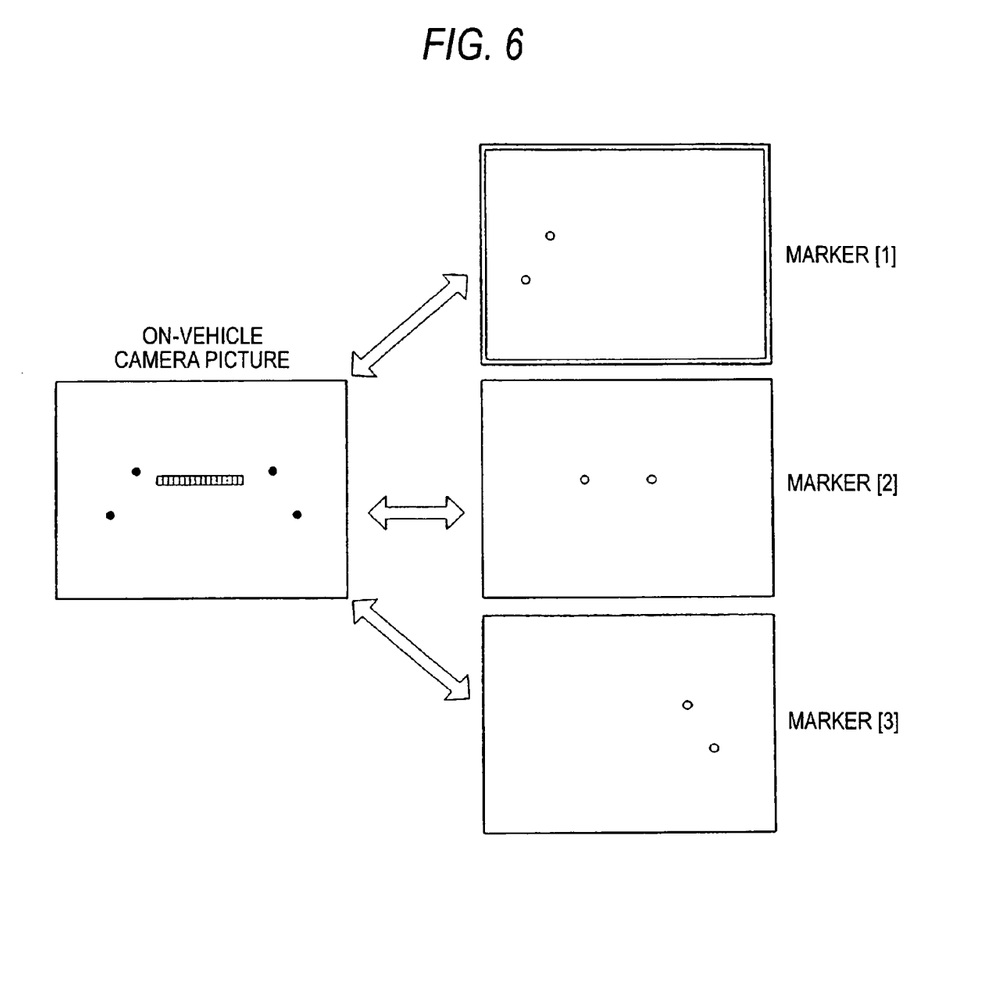
FIG. 6 is a diagram for explaining a setting operation of the individual adjusting amount in the drive assisting apparatus according to the embodiment mode of the present invention.

The display position adjusting unit 44 calculates a display position based upon both the operation result of the joystick and the initial adjusting amount supplied from the locus data selecting unit 43, and then, notifies the calculation result to the locus superimposing unit 45. The locus superimposing unit 45 superimposes the display data entered from the locus data selecting unit 43 on the picture of the on-vehicle camera 2 in such a manner that this display data is moved by the adjusting amount notified from the display position adjusting unit 44. The superimposed image is displayed on the screen of the on-vehicle monitor 5. As a result, since one of the selection buttons 51 of the individual adjusting amount setting unit 41 is depressed, any one of such markers "1" to "3" as represented in FIG. 6 is superimposed on the picture of the on-vehicle camera 2, and then, the superimposed image is displayed on the on-vehicle monitor 5.

Then, as to each of these markers, a display position of this marker is adjusted by employing the joystick of the display position adjusting unit 44 in such a manner that this display position is optimally made coincident with the marker within the picture of the on-vehicle camera 2, and after the position adjusting operation, an ascertain button (defined as "54A") of the individual adjusting amount setting unit 41 is depressed.

When the ascertain button 54A is depressed, this button depression is notified to the locus data selecting unit 43, and the locus data selecting unit 43 temporarily records the adjusting amount with respect to this marker.

Then, when the ascertain button 54 is depressed with respect to all of the remaining markers, the locus data selecting unit 43 calculates an adjusting amount of each of steering angles from the ascertained adjusting amount with respect to each of the markers, and then, sets the calculated adjusting amounts as the individual adjusting amount data contained in the data table 46. In this case, assuming now that a maximum right steering angle and a maximum left steering angle are "$\Theta L$ (<0)" and "$\Theta R$ (>0)" respectively; and the adjusting amount of the marker "1" is "DM1", the adjusting amount of the marker "2" is "DM2", the adjusting amount of the marker "3" is "DM3", an adjusting amount "D($\Theta$)" of a steering angle "$\Theta$" may be calculated in accordance with, for example, the below-mentioned formulae:

$D(\Theta)=DM1\cdot\Theta/\Theta L+DM2\cdot(\Theta L-\Theta)/\Theta L$ (when $\Theta<0$), $D(\Theta)=DM2$ (when $\Theta<0$), $D(\Theta)=DM3\cdot\Theta/\Theta R+DM2\cdot(\Theta R-\Theta)/\Theta R$ (when $\Theta<0$), As previously explained, since the individual adjusting amount is set every steering angle, the optimum adjusting amount can be set every steering angle. It should also be noted that since adjusting amounts of other steering angles are calculated from an adjusting amount of a typical steering angle, the optimum adjusting amounts may be alternatively set in a simple manner while the adjusting operation of the display positions are not carried out with respect to all of the steering angles. It should also be understood that the setting method of the adjusting amounts of the respective steering angles is not limited only to this setting method, but may be alternatively changed, for instance, positioning operations may be actually carried out with respect to all of the steering angles, or the same adjusting amount may be set to steering angles present in a constant range.

Next, a description is made of operations during the normal operation. When a sensor signal derived from the steering angle sensor 3 is inputted to the locus data selecting unit 43, the locus data selecting unit 43 reads out such a locus data corresponding to the angle sensed by the steering sensor from the relevant data set in accordance with the selected set number of the data table 46. Thereafter, the locus data selecting unit 43 notifies both an initial adjusting amount and an individual adjusting amount contained in the locus data to the display position adjusting unit 44, and notifies the display data to the locus superimposing unit 45.

The display position adjusting unit 44 calculates a final adjusting amount based upon both the initial adjusting amount and the individual adjusting amount, which are entered from the locus data selecting unit 43, and then, notifies this calculation result to the locus superimposing unit 45. The locus superimposing unit 45 changes both the adjusting amount of the display position entered from the display position adjusting unit 44 and the display data entered from the locus data selecting unit 43 into the latest adjusting amounts thereof during a vertical blanking period which constitutes a transition of frames of the picture of the on-vehicle camera 2, and continuously superimposes a locus on the picture of the on-vehicle camera 2 based upon the latest locus data. It should also be noted that the display data entered from the locus data selecting unit 43 need not be the display data itself, but may be alternatively realized as an address used to refer to the display data contained in the data table 46. As a result, such a picture of the on-vehicle camera 2 on which the predicted locus in response to the steering angle has been superimposed is displayed on the on-vehicle monitor 5.

As previously explained, since the locus superimposing unit 45 confirms both the display data and the display position adjusting amounts before displaying the frame and precisely adjusts the display position of the locus based upon the latest data, the previously prepared locus can be displayed at the optimum position. As a result, the precision as the guide of the locus can be improved.

Figure 7:
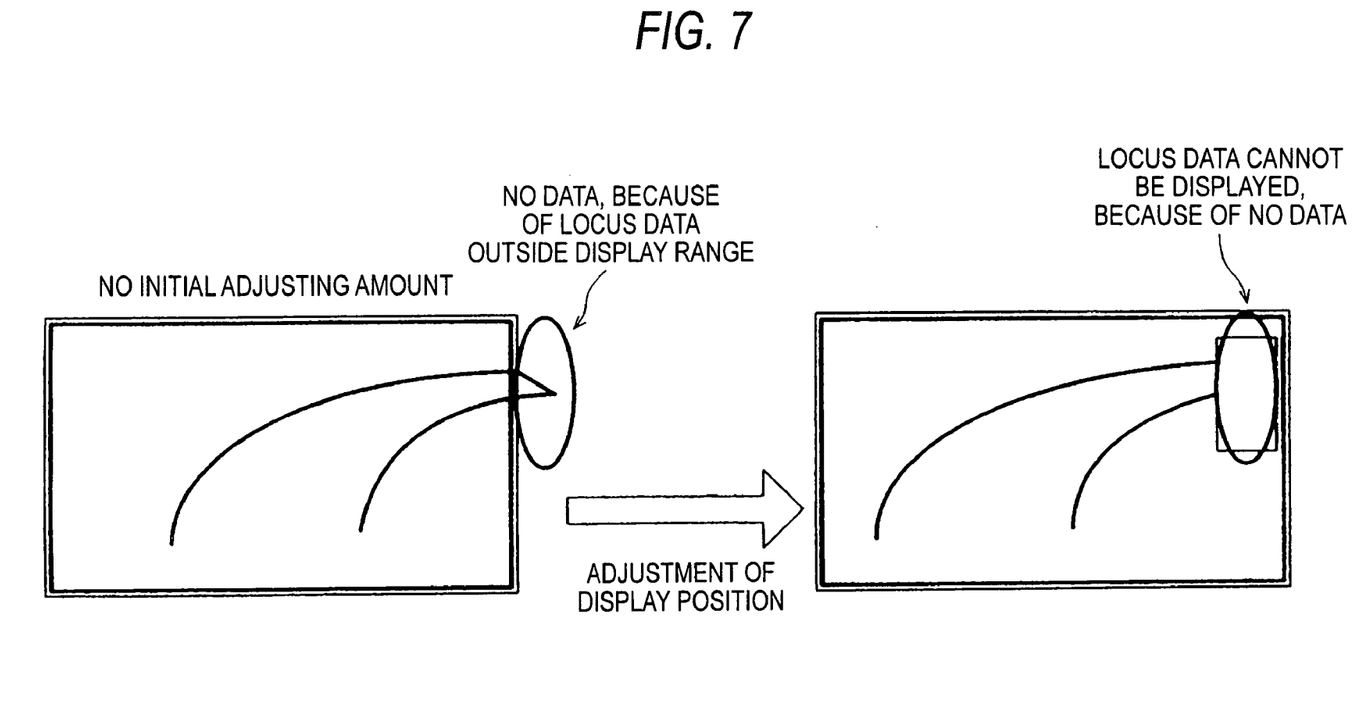
FIG. 7 is a diagram for explaining a setting operation of an initial adjusting amount in the drive assisting apparatus according to the embodiment mode of the present invention.
Figure 8:
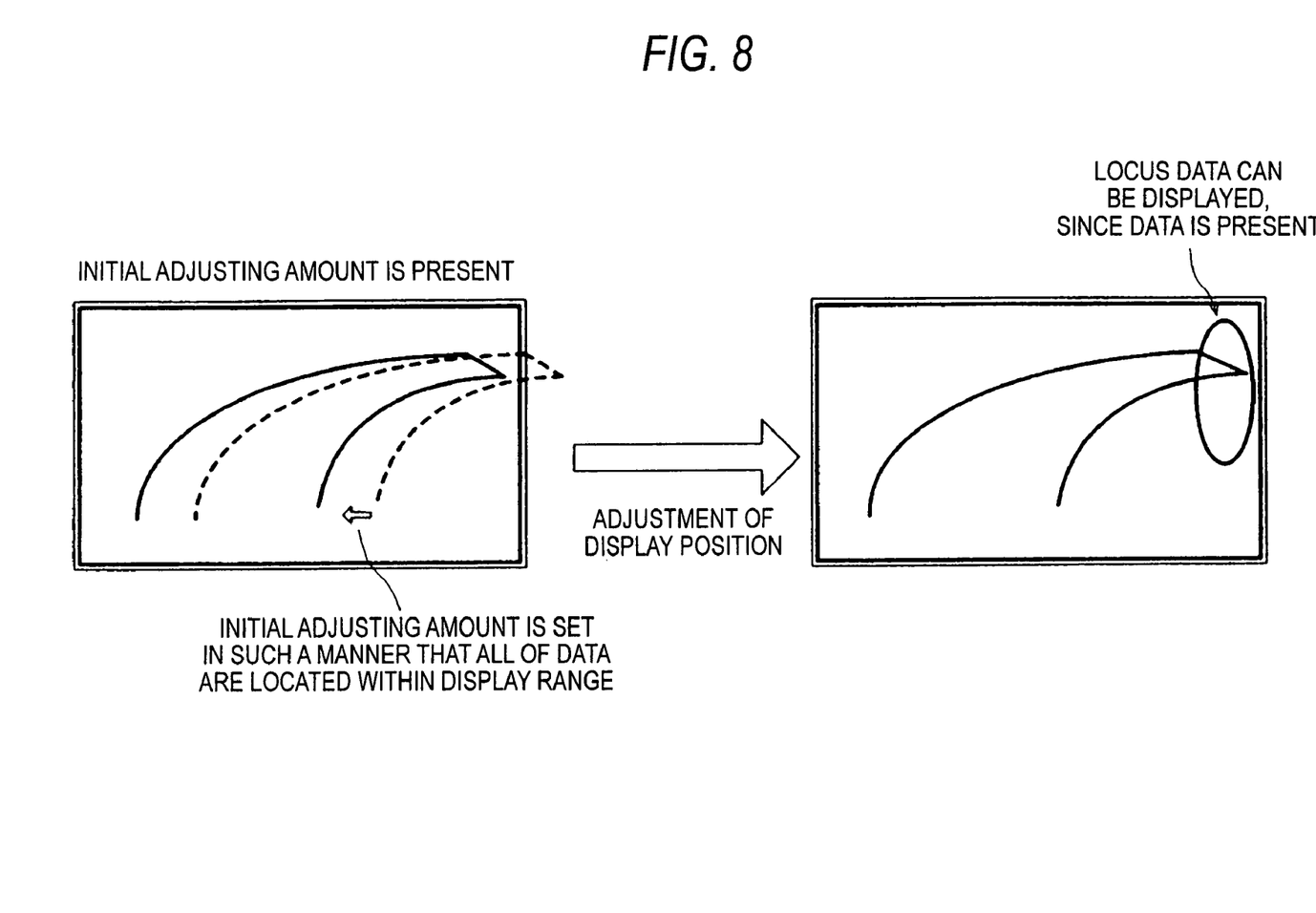
FIG. 8 is a diagram for explaining another setting operation of the initial adjusting amount in the drive assisting apparatus according to the embodiment mode of the present invention.

Next, a method of using an initial adjusting amount will now be explained with employment of FIG. 7 and FIG. 8. In the case that a display position is not adjusted, when data of such a locus whose portion is deviated from the screen to be displayed thereon is stored in the data table 46, the display position is moved in such a manner that an entire portion of the locus is displayed within the screen. At this time, the locus data is set as display data, or a move amount required so as to display the locus data on an original display position is set as an initial adjusting amount. The locus data selecting unit 43 calculates the original display position based upon this initial adjusting amount, and inputs such a position which has been moved from the original display position by the individual adjusting amount to the locus superimposing unit 45. As previously explained, since the initial adjusting amount is set, the locus can be displayed up to the edges of the screen irrespective of the adjusting amounts of the display positions with respect to all of the locus data, while the exceptional process operation for recording the display positions outside the screen is no longer required.

Next, a description is made of the data sets which are previously prepared. As the data sets, a plurality of locus data, either the roll angles or the pan angles of which are different from each other, are prepared. When the on-vehicle camera 2 is installed, 3 variables of a tilt angle, a pan angle, and a roll angle are unknown, which constitute the external parameters of the on-vehicle camera 2. However, an adverse influence caused by a shift of pan angles, or a shift of roll angles appears as a rotation as indicated in FIG. 9 on the screen, and thus, these pan angles and roll angles may be substituted by any one of rotation angles.

Figure 9:
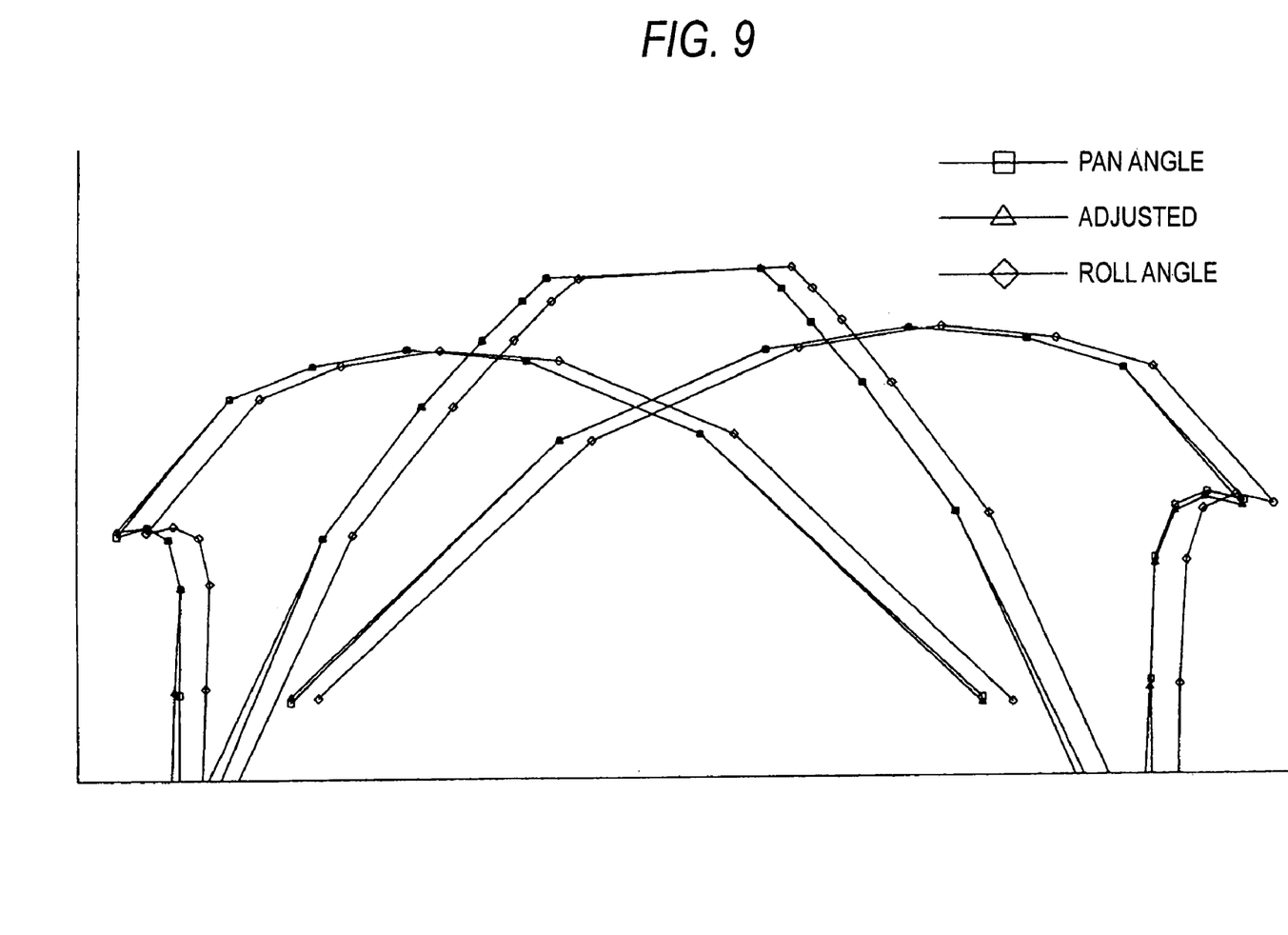
FIG. 9 is a diagram for explaining influences caused by shifts in pan angles and roll angles, which are given to a locus display in the drive assisting apparatus according to the embodiment mode of the present invention.

FIG. 9 indicates display positions of predicted loci on the screen in such a case that a predicted locus when a steering wheel is steered at the same angles along right and left directions, and also, another predicted locus when the vehicle is driven along a straight direction are acquired by a proper on-vehicle camera. While three sets of the loci are displayed, this drawing represents a locus which is rolled at a constant angle, a locus which is panned at a constant angle, and such a locus that the locus rolled at the constant angle has been moved in a parallel manner in such a manner that the display position of the locus rolled at the constant angle is made coincident with the display position of the locus panned at the constant angle as much as possible. Since an adverse influence caused by a shift of tilt angles appears as a parallel move on the screen, this adverse influence may be substantially eliminated by adjusting the display position.

As previously described, since the locus data are prepared while only the roll angle, or only the pan angle is set as the variable, there is an effect that the necessary memory amount can be reduced without deteriorating the precision as the guide of the locus.

Although the inclination of the locus data setting target plate 31 has been employed so as to select the locus data set in this embodiment mode, the locus data set may be alternatively selected by employing another method such as a positional shift of a marker. In such a case that the locus data set is not required to be selected, the locus data set selecting unit 42 is no longer provided in the data setting unit 40.

Although the present invention has been described in detail, or with reference to the specific embodiment modes, apparently, the ordinarily skilled engineers in the art can modify and change the present invention without departing from the technical scope and spirit of the present invention.

The present patent application has been made based upon Japanese Patent Application NO.2003-288976 filed on Aug. 7 in 2003, the contents of which have been incorporated herein as reference.

INDUSTRIAL APPLICABILITY

The present invention has such an advantage that the travel predicted locus which has been previously prepared can be continuously displayed on the optimum position, and the precision as the guide of the travel predicted locus can be improved, and is useful when the present invention is employed in the vehicles such as automobiles.

The invention claimed is:

1. A drive assisting apparatus for displaying an image around a vehicle, which is acquired by an on-vehicle camera, on a screen of an on-vehicle monitor, comprising:
    a data table for storing thereinto locus data which contains locus display data and adjusting data, said locus display data being used to display a travel predicted locus of the vehicle corresponding to a steering angle of a steering wheel on the screen, and said adjusting data being used to adjust a display position of the travel predicted locus on the screen based upon said locus display data;
    steering angle detecting means for detecting the steering angle of the steering wheel; and
    drive assisting image producing means for reading out said locus data corresponding to the steering angle detected by said steering angle detecting means from said data table during a normal driving operation subsequent to a setting operation, for producing a drive assisting image by superimposing the travel predicted locus on the image around the vehicle based upon the locus display data and the adjusting data, which are contained in said read locus data, and for outputting said drive assisting image to said on-vehicle monitor,
    wherein said drive assisting apparatus includes display position adjusting amount setting means for setting a value of the adjusting data contained in the locus data corresponding to said steering angle, and
    wherein based upon a value of adjusting data of said locus data with respect to a typical steering angle, said display position adjusting amount setting means calculates, during said setting operation, values of adjusting data of said locus data with respect to all of other steering angles.

2. A drive assisting apparatus as claimed in claim 1 wherein:
    said locus data stored in said data table contains initial position setting data used to set an initial position of the travel prediction locus based upon locus display data in addition to both the locus display data and the adjusting data.

3. A drive assisting apparatus as claimed in claim 1 wherein:
    said data table stores thereinto a plurality of different locus data sets as to a pan angle, or a roll angle as the locus data corresponding to the steering angle.

4. A drive assisting method for displaying an image around a vehicle, which is acquired by an on-vehicle camera, on a screen of an on-vehicle monitor, comprising the steps of:

forming display data which is used to display a travel prediction locus of a vehicle corresponding to a steering angle of a steering wheel on the screen of said on-vehicle monitor in a superimposing manner;

setting adjusting data used to adjust a display position of said travel prediction locus;

during a normal driving operation subsequent to a setting operation, adjusting the display position of the travel prediction locus formed based upon the display data corresponding to the steering angle of the steering wheel in connection to steering operation of the steering wheel based upon said adjusting data, and for displaying the position-adjusted travel prediction locus on the screen of the on-vehicle monitor in the superimposing manner;

setting a value of the adjusting data contained in locus data corresponding to said steering angle during said setting operation, and based upon a value of adjusting data of locus data with respect to a typical steering angle, calculating values of adjusting data of locus data with respect to all of other steering angles during said setting operation.

* * * * *

UNITED STATES PATENT AND TRADEMARK OFFICE
CERTIFICATE OF CORRECTION

| | | |
|---|---|---|
| PATENT NO. | : 7,756,618 B2 | Page 1 of 1 |
| APPLICATION NO. | : 10/566104 | |
| DATED | : July 13, 2010 | |
| INVENTOR(S) | : Kazufumi Mizusawa | |

It is certified that error appears in the above-identified patent and that said Letters Patent is hereby corrected as shown below:

On the Title page, please replace the "PCT Filed" date to reflect March 1, 2004

Signed and Sealed this

Twenty-sixth Day of October, 2010

David J. Kappos
*Director of the United States Patent and Trademark Office*